United States Patent [19]
Nagamune et al.

[11] Patent Number: 5,323,114
[45] Date of Patent: Jun. 21, 1994

[54] METHOD AND APPARATUS FOR OBTAINING SECTIONAL INFORMATION OF THE UNDERGROUND BY MEASURING TIME DIFFERENCES AND STRENGTH OF ELECTROMAGNETIC SIGNALS

[75] Inventors: Akio Nagamune; Koichi Tezuka; Isamu Komine, all of Tokyo, Japan

[73] Assignee: NKK Corporation, Tokyo, Japan

[21] Appl. No.: 838,442

[22] PCT Filed: Nov. 9, 1990

[86] PCT No.: PCT/JP90/01455
§ 371 Date: Mar. 9, 1992
§ 102(e) Date: Mar. 9, 1992

[87] PCT Pub. No.: WO92/01957
PCT Pub. Date: Feb. 6, 1992

[30] Foreign Application Priority Data

Jul. 24, 1990 [JP] Japan .................... 2-194083
Sep. 21, 1990 [JP] Japan .................... 2-250082

[51] Int. Cl.$^5$ .......... G01V 3/12; G01V 3/30; G01S 13/88
[52] U.S. Cl. .................... 324/334; 324/337; 324/338; 342/22
[58] Field of Search ........... 324/326, 334, 337, 338; 342/22, 459

[56] References Cited
U.S. PATENT DOCUMENTS

| 3,521,154 | 7/1970 | Maricelli . |
| 4,045,724 | 8/1977 | Shuck et al. . |
| 4,114,155 | 9/1978 | Raab . |
| 4,161,687 | 7/1979 | Lytle et al. . |
| 4,326,129 | 4/1982 | Neufeld . |
| 4,742,305 | 5/1988 | Stolarczyk .......... 324/334 |
| 4,994,747 | 2/1991 | Stolarczyk .......... 304/334 |

FOREIGN PATENT DOCUMENTS

| 250986 | 1/1988 | European Pat. Off. . |
| 362992 | 4/1990 | European Pat. Off. . |
| 57-113384 | 7/1982 | Japan . |
| 63-290985 | 11/1988 | Japan . |
| 2145985 | 6/1990 | Japan . |

OTHER PUBLICATIONS

"A Computational Study of Reconstruction Algorithms for Diffraction Tomography: Interpolation Versus Filtered Back-propagation" by S. X. Pan and Avinash C. Kak from *IEEE Transactions on Acoustics, Speech, & Signal Processing*, vol. ASSP-31, No. 5., Oct. 1983.

"Pulse Time-Delay Method for Geophysical Tomography" by Brad L. Carlson and Constantine A. Balanis from *IEEE Transactions on Geoscience and Remote Sensing*, vol. 26, No. 5, Sep. 1988.

Primary Examiner—Gerard R. Strecker
Attorney, Agent, or Firm—Michael N. Meller

[57] ABSTRACT

An underground radar tomography in which an electromagnetic wave is radiated into the ground, the amplitude and propagation time of a transmitted wave, a reflected wave or a diffracted wave of the electromagnetic wave are measured at a number of points, and signal processing is performed on the result of measurement to thereby obtain the distribution of strata and soil in the ground as section information with a high accuracy. By use of two pseudo random signals which are slightly different in period but the same in code pattern, measurement time which is expanded relative to propagation time is obtained to thereby make the measurement accuracy high.

10 Claims, 10 Drawing Sheets

METHOD AND APPARATUS FOR OBTAINING SECTIONAL INFORMATION OF THE UNDERGROUND BY MEASURING TIME DIFFERENCES AND STRENGTH OF ELECTROMAGNETIC SIGNALS

DESCRIPTION

1. Technical Field

The present invention relates to an underground radar tomography and an apparatus therefor, in which an electromagnetic wave is sent into the ground, the amplitude and propagation time of a transmitted wave, a reflected wave or a diffracted wave of the electromagnetic wave are measured, and signal processing is performed on the result of measurement to thereby obtain the distribution of strata and geologic features in the ground as sectional information, and particularly relates to the detection of a very weak signal attenuated by the propagation of the signal through the underground.

2. Background Art

For the investigation of a rock bed, it is necessary to estimate detailed information about the existence, distribution shape or the like, of dislocations, crushed belts, cracks, etc. In the tomographic arts it is possible to analyze a stratum structure in section and display it graphically. An underground tomography using an electromagnetic wave is expected to be effective in resolution, non-destructivity, etc.

Conventional underground tomographic arts using an electromagnetic wave are briefly classified into a continuous-wave amplitude detection method and an underground radar tomography. They both are designed to perform operational processing upon the obtained data and display a stratum structure as a sectional. They are different in the way to obtain the basic data in the following ways.

(1) Continuous-Wave Amplitude Detection Method

This method is a method in which a continuous-wave-like electromagnetic wave is propagated in the ground, and the attenuation of the transmitted wave of the electromagnetic wave is measured to thereby obtain the distribution of an attenuation factor of a rock bed to estimate the state of the rock bed. This method is disclosed, for example, in the literature by D. L. Larger and R. J. Lytle, "Determining a subsurface electromagnetic Profile from high-frequency measurements by applying reconstruction-technique algorithm," Radio Science, vol. 12, No. 2, p. 249, Mar.–Apr. 1977.

This system is based on the same principle of a medical X-ray tomography. In the case of underground investigation, however, there is a defect that it is impossible to obtain enough accuracy because measured points are limited and only amplitude information is used. In addition, the attenuation of an electromagnetic wave in the ground is so large that it is impossible to obtain enough strength of a received signal, and the range to be investigated is very much limited.

(2) Underground Radar Tomography

A so-called underground radar tomography is a system in which a pulse-like electromagnetic wave is transmitted into the ground, and the strength and propagation time of the reflected wave, transmitted wave or diffracted wave of the electromagnetic wave are measured. For example, such a system is disclosed in the literatures by Masaki Nagata and Toshihiko Sakayama, "Utilization of Electromagnetic Wave Prospect in Rock-Bed Investigation", Extended Abstracts of '86 Study Meeting, Japan Society of Engineering Geology, p. 95, 1986, and by Hideo Otomo, "Present Situation of Geotomographic Technique", Physical Prospect, vol. 39, no. 6, Dec. 1986.

Recently this system has been observed because it uses information about the characteristics of attenuation and propagation time in the ground so that it can estimate the detailed structure of strata. The system however uses a pulse-like electromagnetic wave, and therefore the signal is apt to be attenuated in the soil so that the reception signal strength becomes so weak that the range which can be investigated at a time is limited. In addition, in the current state, it is difficult to increase transmission power because of the limitation in devices and the deterioration in electromagnetic environment. Particularly in a place of a thick stratum of soil such as Kanto Loam Layer in Japan, the soil contains much water so as to cause large attenuation of electromagnetic wave so that the practical limitation on the range to be investigated becomes important in such a system as a conventional radar tomography which is apt to be very much influenced by the attenuation in soil.

DISCLOSURE OF INVENTION

It is therefore an object of the present invention to provide an underground radar tomography and an apparatus therefor, in which information about the characteristics of attenuation and propagation time in the ground can be obtained, and an electromagnetic wave attenuated and weakened can be detected at a high sensitivity, thereby making it possible to investigate a wide area at a time and in detail.

It is another object of the present invention to provide an underground radar tomographic apparatus in which the influence of noises from the outside can be eliminated.

It is a further object of the present invention to provide an underground radar tomographic apparatus in which the signal-to-noise ratio, S/N, can be improved.

According to an aspect of the present invention, in an underground radar tomography and an apparatus therefor in which an electromagnetic wave is transmitted into the ground, the amplitude and propagation time of the transmitted wave, reflected wave or diffracted wave of the electromagnetic wave are measured at a number of points, and signal processing performed on the result of measurement is used to obtain an analysis of strata and soil of the underground as sectional information. There is a feature in that two pseudo random signals which are slightly different in period from each other but are the same in code pattern with each other are used. This point will be described in more detail later.

Since the two pseudo random signals are the same in code pattern with each other, they can be in phase at a certain point of time, but they become out of phase as the time proceeds, and if the phases thereof are shifted from each other by one code or more, the two pseudo random signals have no correlation therebetween.

If the two pseudo random signals are multiplied by each other when they are in phase, a positive signal is produced continuously, and if this positive signal is passed through a low pass filter, an integrated large value is obtained. On the other hand, when the two pseudo random signals are out of phase, the result of multiplication takes a positive or negative value at random, and if this resultant signal is passed through the low pass filter, the signal is averaged into zero. Further, if time further proceeds, the two pseudo random signals become in phase again so that a pulse-like signal is produced in the output of the low pass filter. These operations are repeated. At this time, even if noise is superimposed on the original signals, the noises is controlled by the low pass filter so that signal processing having a superior SN ratio is performed.

For example, in comparison with the maximum value of a signal obtained by passing, through a low pass filter, a product obtained by directly multiplying a first M-sequence signal by a second M-sequence signal, the maximum value of a signal obtained by passing, through the low pass filter, a product obtained by multiplying the second M-sequence signal by the first M-sequence signal which has passed through a transmission antenna, the underground, and a reception antenna occurs with a delay by a time difference corresponding to the propagation time in the ground. In addition, since the signal amplitude is reduced correspondingly to the attenuation due to the propagation in the ground, by measuring the time difference and the signal amplitude, it is possible to obtain information necessary to obtain a sectional image as radar tomography. At this time, even if the signal attenuation due to the propagation in the ground is large, a signal having a superior SN ratio can be obtained making it possible to investigate a wide range of underground conditions.

In addition, according to the one aspect of the present invention, as will be described hereinafter, it is possible to obtain an output as a signal made lower in speed than the real propagation time of an electromagnetic wave in the ground, so that it becomes easy to deal with this output signal. That is, let the propagation time be $\tau$, the frequency of a first clock generator be $f_1$, and the frequency of a second clock generator be $f_2$, and with the time difference $T_D$ representing the output signal expanded on a large scale by the following expression:

$$T_D = \tau \cdot f_1 / (f_1 - f_2) \quad (1)$$

The propagation time $\tau$ is expanded in the time axis by $f_1/(f_1-f_2)$, or measured as $T_D$ at low speed.

By processing information of the time difference $T_D$ and the signal strength measured thus, it is possible to obtain sectional information of strata and soil in the ground.

According to one aspect of the present invention, an electromagnetic wave is transmitted into the ground, and the amplitude and propagation time of the transmitted wave, reflected wave or diffracted wave of the electromagnetic wave can be measured with a high accuracy at the same time, so that it is possible to obtain detailed underground sectional information. In addition, even if the signal attenuated due to the underground propagation, it is possible to obtain a signal having a superior SN ratio, so that a wide range can be investigated at a time. Particularly, even in a location in which Kanto Loam Layer is thick so that there is much water in the soil and the attenuation of an electromagnetic wave is large, it is possible to improve the efficiency of underground investigation.

According to another aspect of the present invention, the underground radar tomographic apparatus uses a light transmission system suitable for the above-mentioned signal processing as a means to counter noises due to high sensitivity. This point will be described next.

In a radar apparatus, two M-sequence signals which are the same in code pattern but slightly different in period are produced, and one of the signals is converted into a light signal and transmitted to a far transmitting sonde through an optical cable, so that it is possible to eliminate radiation of electromagnetic waves or the like from the cable between the radar apparatus and the transmission sonde. In this optical cable, of course, no metal is used as a core, a tension member, or a material of housing. In the transmission sonde, a light signal is converted into an electric signal and the electric signal is then supplied to an antenna so that an electromagnetic wave is transmitted into the ground.

The other M-sequence signal of the radar body is converted into a light signal, and transmitted to a far reception sonde through an optical cable, and in the reception sonde, this is converted to an electric signal, and the electric signal is multiplied by a signal obtained by receiving the electromagnetic wave from the underground through a receiving antenna. The obtained product is subjected to band limitation by a low pass filter to thereby obtain a detection signal processed by correlation operation processing. The detection signal is converted into a light signal, and the light signal is transmitted to the radar apparatus through an optical cable. In the radar apparatus, this light signal is converted into an electric signal to thereby obtain the detection signal.

As has been described, the radar apparatus and the far reception sonde are coupled through a non-metal optical cable so as to receive no influence of electromagnetically induced noises.

According to the other aspect of the present invention, therefore, a light transmission system using an optical fiber is used and noises are not mixed into between the radar apparatus and the transmission and reception sondes, so that it is possible to obtain sectional information of the underground with a high sensitivity.

In addition, according to a further aspect of the present invention, the underground radar tomographic apparatus has a feature in that two clock frequencies are made variable, and the cut-off frequency of a low pass filter is made variable. This point will be described next.

To realize a method to improve the SN ratio, it is easily considered to use an amplifier superior in noise figure as a receiver. Even if an ideal low-noise amplifier is used, however, a thermal noise is inevitable. A thermal noise is a noise produced depending on thermal vibration of molecules constituting a substance, and it is always produced if there is a temperature.

Let the absolute temperature be T, a frequency band be B, and the Boltzmann constant be k, and the size of this thermal noise Np is given by the following expression.

$$N_p = kTB \quad (2)$$

Let the two clock frequencies be $f_1$ and $f_{r2}$ ($f_1 > f_2$), and if an M-sequence signal driven with $f_1$ is transmitted, the frequency band Bt of the transmitted signal is expressed by:

$$B_t \approx 5 \cdot f_1 \quad (3)$$

On the other hand, the frequency band Br of a detection signal is obtained through a process in which a received waveform is multiplied by an M-sequence signal driven with the clock frequency $f_2$ and the thus obtained product is passed through a low pass filter is decided depending on the cut-off frequency of the low pass filter. At this time, it is necessary to decide the cut-off frequency $f_{cut}$ so that information carried by the detection signal should not be omitted. In the detected waveform, the frequency band $5 \cdot f_1$ of the correlation function of the M-sequence signal is made low in speed by $f_1/(f_1-f_2)$, so that the frequency band Br is expressed by:

$$Br = 5 \cdot (f_1-f_2) \quad (4)$$

It is therefore rational that the cut-off frequency of the low pass filter is established as follows, $$(f_1-f_2) < f_{cut} < 20(f_1-f_2) \quad (5)$$

To simplify the circuit configuration, two methods are considered. One of the methods is such that the cut-off frequency of the low pass filter is fixed and noises are reduced through digital signal processing by a signal processing device in the succeeding stage after taking in the detection signal. The other method is such that the cut-off frequency of the low pass filter is made always as follows:

$$f_{cut} = 5 \cdot (f_1-f_2) \quad (6)$$

In either method, the noise suppression effect $N_{sup}$ in this case is expressed, in the consideration of the expressions (2) and (3), as follows:

$$N_{sup} = f_1/(f_1-f_2) \quad (7)$$

That is, if $\Delta f = f_1 - f_2$ is made small, it is possible to obtain a large noise suppression effect. If $\Delta f$ is made small, however, the speed of shifting of the two M-sequence signals is delayed, so that the measurement time is prolonged. It is therefore effective to make the frequency variable so as to make $\Delta f$ small in accordance with the necessity to thereby improve the SN ratio.

In addition, according to another aspect of the present invention, the underground radar tomographic apparatus has a feature in that the code length of a pseudo random signal is made variable so that the SN ratio is changed by changing the noise elimination ratio of a received signal. This point will be described next. If the above-mentioned clock frequency is changed, the range of measurable distance is also changed. That is, let the propagation speed be v and the period of an pseudo random signal be $N_{ran}$, and the propagation distance L is expressed by the following expression.

$$L = N_{ran} \cdot v/f_1 \quad (8)$$

In the case where the required measurement distance is decided, therefore, if the frequency is changed, it is necessary to change the period of the pseudo random signal in accordance with the expression (8).

According to this aspect of the present invention, therefore, in the case where a larger SN ratio is necessary, it is possible to improve the SN ratio by making the frequency difference between two clock frequencies small, although response speed becomes low. On the other hand, in the case where there is a limit in measurement time so that a shorter measurement time is required, it will go well if the frequency difference between the two clock frequencies is made large, although the SN ratio is deteriorated.

In addition, with respect to a measurement range which is changed by the changing of the clock frequency, it is made possible to establish a proper measurement range by using an M-sequence signal generator which can change the code length of an M-sequence signal.

BEST MODE FOR CARRYING OUT THE INVENTION

Figure 1:
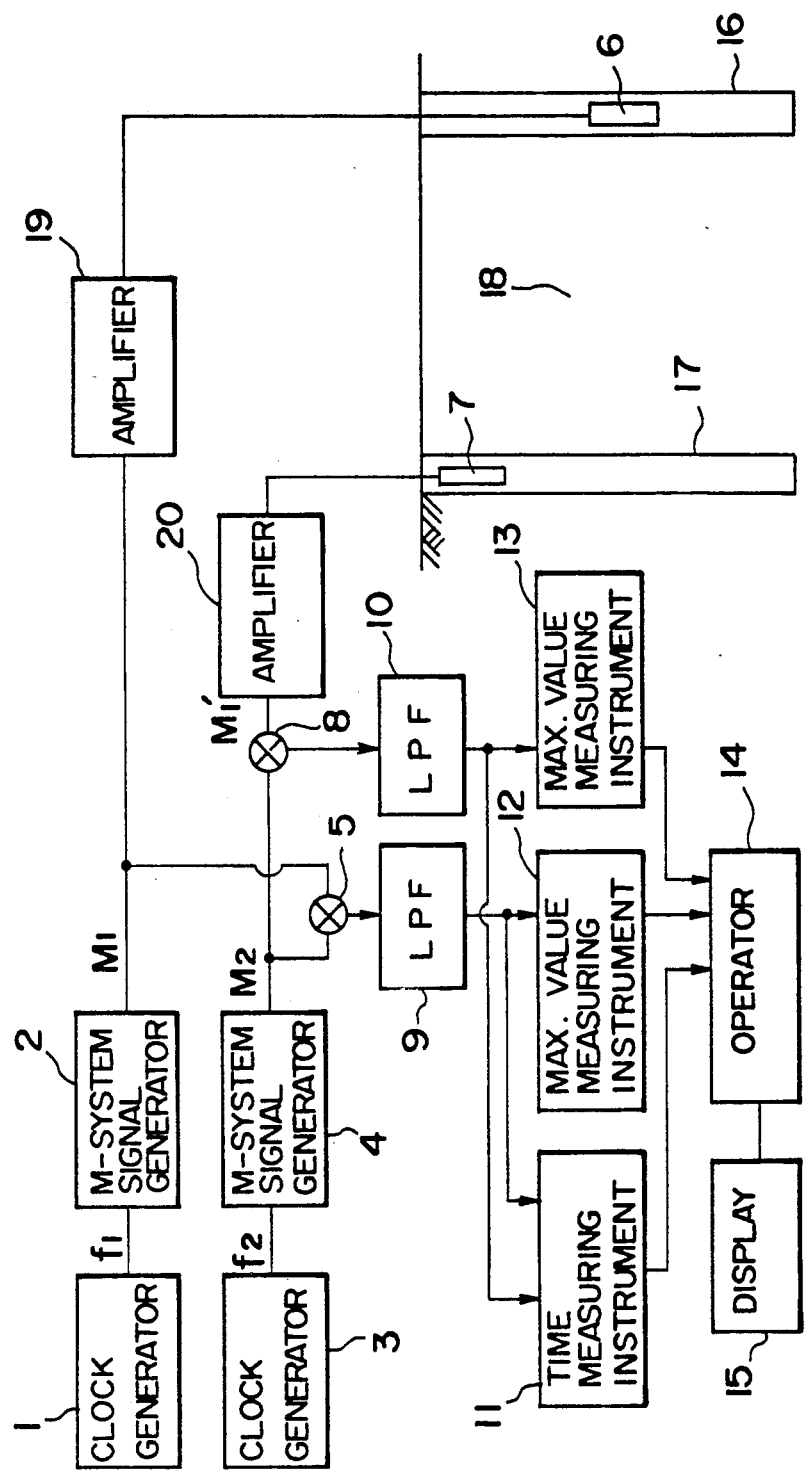
FIG. 1 is a block diagram illustrating the configuration of the underground radar tomographic apparatus according to an embodiment of the present invention.

FIG. 1 is a block diagram illustrating the configuration of the underground radar tomographic apparatus according to an embodiment of the present invention. In FIG. 1, the reference numeral 1 represents a clock generator, and 2 represents an M-sequence signal generator as a first pseudo random signal generator. The reference numeral 3 represents a clock generator, and 4 represents an M-sequence signal generator as a second pseudo random signal generator. The reference numeral 5 represents a multiplier, and 6 represents a transmission antenna. The reference numeral 7 represents a reception antenna, and 8 represents a multiplier. The reference numerals 9 and 10 represent low pass filters (LPF), the cut-off frequencies of which are set to 400 KHz. The reference numeral 11 represents a time measuring instrument, and 12 and 13 represent maximum value measuring instruments. The reference numeral 14 represents an operator which obtains a sectional image of the underground through an operation, which will be described later, by use of a microcomputer, and displays the obtained sectional image on a display 15.

The reference numeral 16 represents a transmission borehole, and 17 represents a reception borehole. The transmission borehole 16 and the reception borehole 17 are based on a cross bore system, and, usually, the distance between these boreholes is selected to be in a range of from 10 m to 50 m, and the depth of each borehole is selected to be in a range of from 10 m to 100 m. The transmission antenna 6 and the reception antenna 7 are constituted by small waterproofed dipole antennas, and suspended respectively in the boreholes 16 and 17 by wires so as to perform measurement while their positions are being changed. The reference numeral 18 represents the underground, 19 represents a transmission amplifier, and 20 represents a reception amplifier.

Next, the operation of the apparatus shown in FIG. 1 will be described.

The clock generator 1 produces a clock signal of a frequency $f_1$, and the clock generator 3 produces a clock signal of a frequency $f_2$. One of features of the present invention is that these frequencies $f_1$ and $f_2$ of the respective first and second clock signals are set to extremely nearby values so that the frequency difference therebetween is slight. Now, assuming that $f_1 = 100.004$ MHz and $f_2 = 99.996$ MHz, the case of the frequency difference $f_1 - f_2 = 8$ KHz will be described. Clock signals of the frequencies $f_1$ and $f_2$ respectively generated from the clock generators 1 and 3 are supplied to the M-sequence signal generators 2 and 4 respectively as synchronizing signals for generating M-sequence signals.

The M-sequence signal generators 2 and 4 are employed as one of pseudo random generating means. Alternatively, Barker Code generators may be used in place of the M-sequence signal generators. In this embodiment, an M-sequence code of 7 bits is used, and the configuration of the generator in this case is shown in the diagram of FIG. 2.

Figure 2:
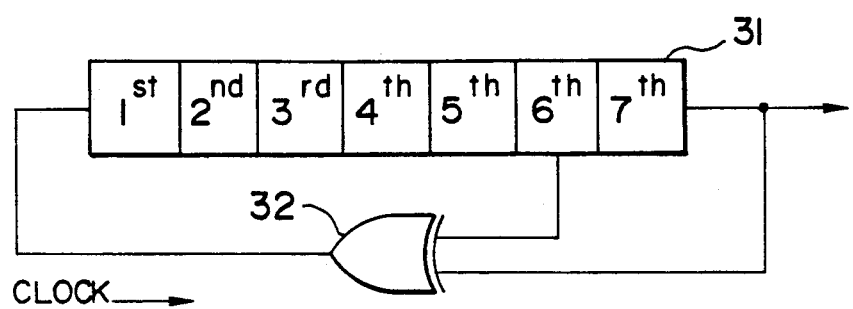
FIG. 2 is a circuit diagram of an M-sequence signal generator in FIG. 1.

That is, FIG. 2 is a diagram illustrating the configuration of each of the 7-bit M-sequence signal generators 2 and 4. In FIG. 2, the reference numeral 31 represents a shift register having a 7-stage structure, and 32 represents an exclusive OR circuit. By each of these M-sequence signal generators 2 and 4, a signal having a code length period of 127 bits is produced. Specifically, the shift register 31 is constituted by 7 stages of flip-flops synchronized with a clock signal, and the output signals of the flip-flops in the sixth and seventh stages are supplied to the flip-flop in the first stage through the exclusive OR circuit 32. Thus, a not-shown clock signal to each of the flip-flops in the respective stages, and an output signal is obtained from the flip-flop in the seventh stage, so that it is possible to generate an M-sequence code synchronized with the clock signal. The thus generated M-sequence code is a periodical circulating code constituted by a combination of "1" and "0" or "+" and "−".

Figure 3:
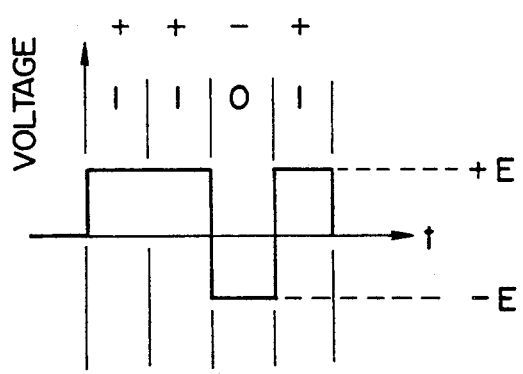
FIG. 3 is a diagram of an output waveform of the M-sequence signal generator.

FIG. 3 is a diagram of an output waveform of the M-sequence signal generator. In this embodiment, the codes "1" and "0" means generation of signals of a positive voltage ($+E$) and a negative voltage ($-E$) respectively. In the case where this M-sequence signal is generating circulatingly, one period is completed when $2^7 - 1 = 127$ number of signals are produced since the number of bits is 7 in this embodiment. Then the same signals as those in the previous period are produced from the next 128th signal, and such a period is repeated and circulated.

Generally, being a random signal when viewed partially, this M-sequence signal is used as a signal using an autocorrelation function, and applied to a pulse compression radar in the description of a conventional apparatus.

The M-sequence signal generators 2 and 4 are constituted by the same circuits for generating the same 7-bit M-sequence signals while they are supplied with clock signals having frequencies $f_1$ and $f_2$ which are slightly different from each other. A shift register having a clock frequency of about 100 MHz may be easily realized by, for example, ECL (emitter-coupled logic) elements. The respective M-sequence signal generators 2 and 4 circulatingly output M-sequence signals $M_1$ and $M_2$ each constituted by the voltages $+E$ and $-E$, 127 in number per period. However, since the frequencies of the inputted clock signals are different from each other slightly, the periods of the two M-sequence signals $M_1$ and $M_2$ are different from each other slightly. Now, the respective periods of the two M-sequence signals $M_1$ and $M_2$ can be obtained as follows.

(The period $M_1$) = $127 \times 1/100.004$ MHz = $1269.9492$ ns (The period $M_2$) = $127 \times 1/99.996$ MHz = $1270.0508$ ns That is, although each of the two M-sequence signals $M_1$ and $M_2$ has a period of about 1270 ns ($10^{-9}$ sec), there is a time difference of about 0.1 ns between the respective periods of the two signals. Therefore, if these two M-sequence signals $M_1$ and $M_2$ are circulatingly generated and if the patterns of the two M-sequence signals are made coincident at a certain point of time $t_a$, a time gap of 0.1 ns is produced between the two signals every time when the time corresponding to one period elapses, and a time gap of 10 ns is produced between the two signals after a lapse of time corresponding to 100 periods. Then, the M-sequence signal produces 127 pieces of signal in its one period 1270 ns, so that the production time of one piece of signal is 10 ns.

Therefore, the time gap 10 ns produced between the two M-sequence signals $M_1$ and $M_2$ is equal to the time gap corresponding to one piece of M-sequence signal. The timing relationships among those various signals are shown in FIG. 4.

Figure 4:
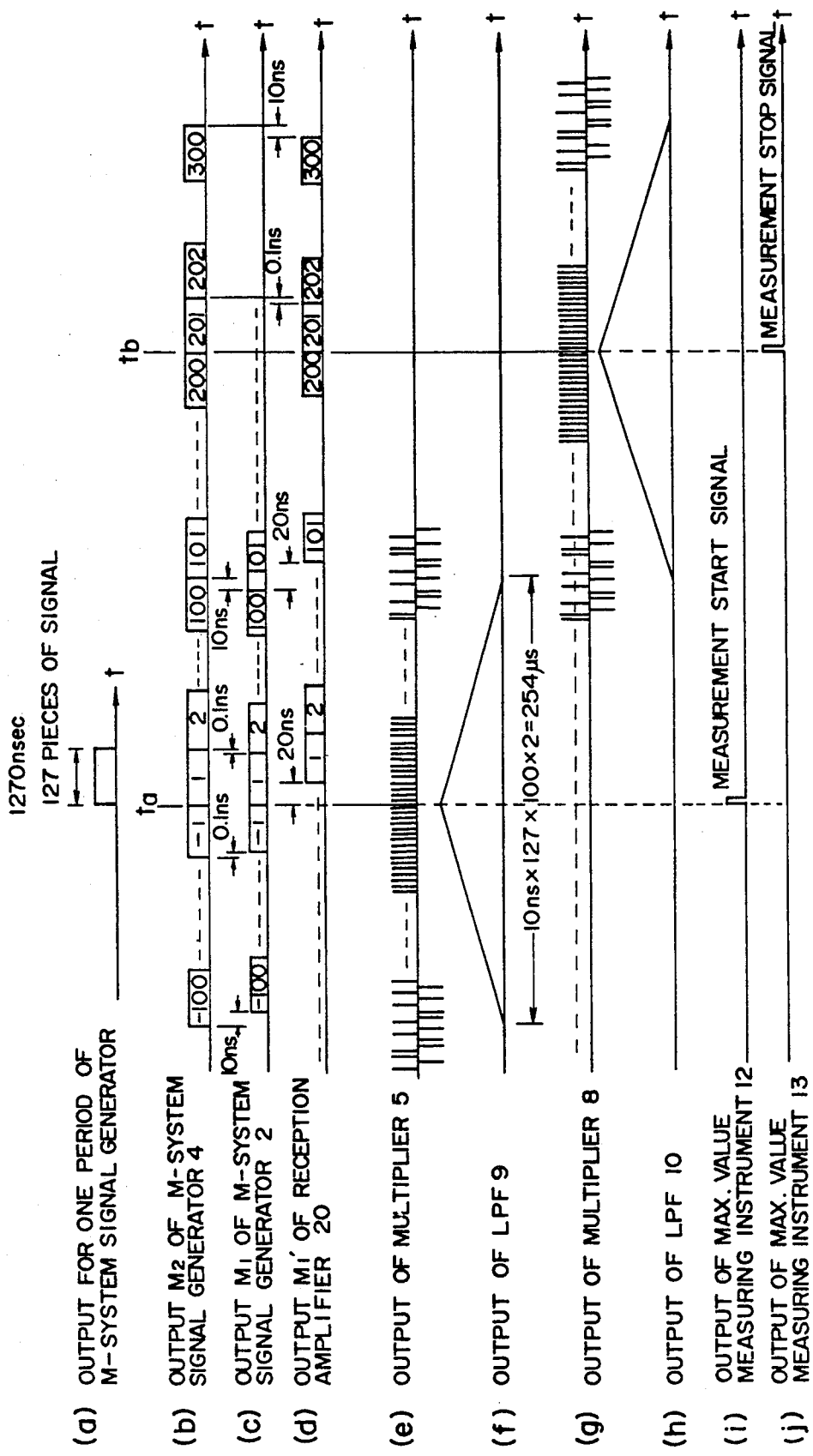
FIG. 4 is a time chart illustrating the operation of the apparatus of FIG. 1.

FIG. 4 is a waveform diagram for explaining the operation of the apparatus shown in FIG. 1. In FIG. 4, the diagram (a) shows that the one-period output of the M-sequence signal generator 4, which acts as a reference, includes 127 pieces of signal, the one period being 1270 ns. The diagram (b) shows the state in which the output $M_2$ from the M-sequence signal generator 4 is circulatingly produced during the time from the −100th period till the 300th period. The diagram (c) shows that the output $M_1$ from the clock generator is shorter than the output $M_2$ by 0.1 ns in one period and 10 ns in 100 periods, and that the two M-sequence signals $M_1$ and $M_2$ are synchronized with each other so that at the point of time $t_a$ their signal patterns are coincident. In addition, if the signal patterns of these M-sequence signals $M_1$ and $M_2$ are coincident at a certain point of time, the time gap between the signals gradually increases thereafter. When a constant time has elapsed, the patterns of the both signals become coincident with each other again. In this embodiment, every time when about 126,777 periods of the M-sequence signal $M_1$ and 126,767 periods of the M-sequence signal $M_2$ have elapsed, that is, every time when the time of about 16.1 ms has elapsed, the coincidence of the patterns of these two M-sequence signals $M_1$ and $M_2$ are produced repeatedly.

Each of the M-sequence signals $M_1$ and $M_2$ respectively produced from the M-sequence signal generators 2 and 4 is branched into two one-side of which is supplied into the multiplier 5. As the multipliers 5 and 8, for example, broad band double balanced mixers (DBM) are used so as to multiply two M-sequence signals. An M-sequence signal is a positive or negative voltage signal as mentioned above, so that the product as the result of multiplication of the same signs becomes a positive voltage, and that of the different signs becomes a negative voltage. Accordingly, a positive or negative voltage signal is obtained as the output of each of the multipliers 5 and 8.

Therefore, in the vicinity of the point of time $t_a$ at which the patterns of the two M-sequence signals $M_1$ and $M_2$ are coincident with each other, the output signal of the multiplier 5 is a DC positive voltage or a positive voltage pulse train. However, the periods of these two M-sequence signals $M_1$ and $M_2$ are different from each other slightly, and the time gap of 0.1 ns is produced between the both signals every time when the time of one period elapses. In 100 periods after the point of time $t_a$, the time gap of 10 ns, that is, the time gap corresponding to one piece of signal is produced between the two M-sequence signals $M_1$ and $M_2$. In this state, the two signals have no correlation therebetween so that a signal of positive and negative pulse train is produced at random in the output of the multiplier 5. The output waveform of this multiplier 5 is shown in the diagram (e) of FIG. 4.

The output signal of the multiplier 5 is supplied to the low pass filter 9 so as be converted into a DC voltage. Each of the low pass filters 9 and 10 has a cut-off frequency $f_c$ and has a function to attenuate an input signal at its high-frequency component which is higher in frequency than the cut-off frequency $f_c$ to thereby smooth the input signal. The output signal of the low pass filter 9 takes the maximum value at the point of time $t_a$ when the patterns of the two M-sequence signals $M_1$ and $M_2$ are coincident with each other. The output signal of the low pass filter takes the minimum value at the time when the M-sequence signal $M_2$ is shifted forward or backward by 100 periods from the point of time $t_a$, that is, at the point of time $t_a \pm 127$ $\mu$s. This output signal is a voltage signal of a triangular wave decreasing straight from this maximum value as an apex to the forward and backward minimums. The output waveform of this low pass filter 9 is shown in the diagram (f) of FIG. 4. This triangular-wave voltage signal is outputted from the low pass filter 9 every 16.1 ms when the synchronized state between the two M-sequence signals occurs as mentioned above.

The output signal from the low pass filter 9 is supplied to the maximum value measuring instrument 12. The maximum value measuring instruments 12 and 13 have a function to detect the maximum value of a voltage signal of a triangular wave supplied from the low pass filters 9 and 10 respectively, that is, to detect the voltage of the apex of the triangular wave, and to output one pulse signal at the time of detecting the maximum voltage value. As a method to detect the time of producing the maximum voltage value, for example, it will do to provide an A/D converter and a digital data comparator so that an analog signal of a triangular wave inputted by a high-speed sampling signal is successively converted into a digital signal, and, always, the size of digital data obtained by a present sampling signal is compared with the size of digital data obtained by the preceding sampling signal one sampling before to thereby detect the time when the input signal is inverted from an increasing state into a decreasing state on the axis of time. Similarly to this, the same function may be realized by successively comparing analog signals sampled in the same manner. In the case there is a possibility of occurrence of small peaks because of noises or the like, a threshold value may be determined so that a peak value is detected only with respect to a signal which exceeds this threshold value.

The maximum value measuring instrument 12 supplies a pulse output as a measurement start signal to the time measuring instrument 11 when the maximum value of an input signal is detected. If the measurement start signal is supplied from the maximum value measuring instrument 12, the display 15 starts to measure time. This state is shown in the diagram (i) of FIG. 4.

The M-sequence signal $M_1$ outputted from the M-sequence signal generator 2 is branched into two as described above, and the other-side of the two is supplied to the transmission amplifier 19 so as to be power-amplified to obtain output power of about 500 mW. The M-sequence signal from the transmission amplifier 19 is supplied to the transmission antenna 6. The transmission antenna 6 radiates an electromagnetic wave of the M-sequence signal into a propagation medium. This radiated electromagnetic wave is transmitted through the underground 18 which, as the propagating medium, has a different conductivity or permittivity value depending upon the composition of the soil strata and the presence of rocks or stones thereby affecting the transmitted wave, reflected wave or diffracted wave of the electromagnetic wave detected by the reception antenna 7.

For example, a signal detected by the reception antenna 7 is supplied to the reception amplifier 20 in which amplification and wave-shaping are performed. An output signal $M_1'$ of the reception amplifier 20 is a signal which is delayed more than the M-sequence signal $M_1$ by a time corresponding to a propagation time of an electromagnetic wave which is radiated, correspondingly to the M-sequence signal $M_1$, from the transmission antenna 6 and then received by the reception antenna 7. Strictly, there are fixed signal delay times in the transmission amplifier 19, the reception amplifier 20, etc., but these fixed delay times can be eliminated on measurement by a method to eliminate the fixed delay times in the step of measurement processing, a method to supply an output signal $M_1$ from the M-sequence signal generator 2 to the multiplier 5 through a delay circuit having equivalent delay time when the signal is supplied to the multiplier 5, or a method like these.

In the above-mentioned manner, the M-sequence signal $M_1'$ having a delay time proportional to the propagation time of an electromagnetic wave between the transmission antenna 6 and the reception antenna 7 is outputted from the reception amplifier 20 (FIG. 4(d)), and supplied to one input of the multiplier 8.

On the other hand, the M-sequence signal $M_2$ outputted from the M-sequence signal generator 4 is branched into two as described above, and the other-side of the two is supplied to the other input of the multiplier 8. In the multiplier 8, the two M-sequence signals $M_1'$ and $M_2$ are multiplied by each other in the same manner as in the multiplier 5. The multiplier 8 supplies the product as a result of multiplication (the diagram of FIG. 4) between the two M-sequence signals $M_1'$ and $M_2$ to the low pass filter 10. The low pass filter 10 outputs a voltage signal of a triangular wave having an apex which occurs when the respective patterns of the two M-sequence signals $M_1'$ and $M_2$ are coincident with each other (the diagram (h) of FIG. 4), the voltage signal being supplied to the maximum value measuring instrument 13.

The above-mentioned operation is the same as the operation described with respect to the multiplier 5 and the low pass filter 9. A different point in the time is when the patterns of the two M-sequence signals $M_1'$ and $M_2$ are coincident with each other. The operation of the maximum value measuring instrument 13 is the same as that of the above-mentioned maximum value measuring instrument 12, but supplies a produced pulse output, as a measurement stop signal at this time, to the time measuring instrument 11 (the diagram (j) of FIG. 4). The time measuring instrument 11 measures the time from the point of time $t_a$ at which a measurement start signal is supplied thereto till the point of time $t_b$ at which a measurement stop signal is supplied thereto. As a time measurement method, for example, a method in which a time gate which continues from the start of measurement to the stop of measurement is provided so that clock signals are counted in this time gate, or a method like this, may be used.

A major feature of the present invention different from a general radar apparatus is in that the measurement time is substantially extremely expanded. That is, for example, measurement of the distance of 3 meters in the air by a general radar is equivalent to measurement of the time of 20 ns ($20 \times 10^{-9}$ sec), but according to the present invention, to measure the distance of 3 meters is to measure the time of 254 $\mu$s ($254 \times 10^{-6}$ sec). That is, it will do to measure a signal which is expanded by 12,700 times on the time axis, that is, made to have an extremely low speed. Therefore, in comparison with a conventional apparatus, the radar apparatus according to the present invention has a large feature in that it is possible to improve the accuracy in measurement of short distance and it is possible to easily constitute the apparatus by inexpensive low-speed elements. The time measurement by the time measuring instrument 11 is performed every time when the measurement start signal is inputted every 16.1 ms as described above.

The propagation time and amplitude of a transmitted wave, a reflected wave or a diffracted wave are measured at a time by the time measuring instrument 11, the maximum value measuring instrument 12 and the maximum value measuring instrument 13, and supplied into the operator 14 in which a sectional image of the underground is operated, so that the sectional image is displayed on the display 15. A signal processing algorithm itself for obtaining a sectional image in the operator 14 is conventionally known, and, for example, the algebraic reconstruction technique, the simultaneous iterative reconstruction technique, or the diffraction tomography may be used, but a so-called repetition method is employed here.

Figure 5:
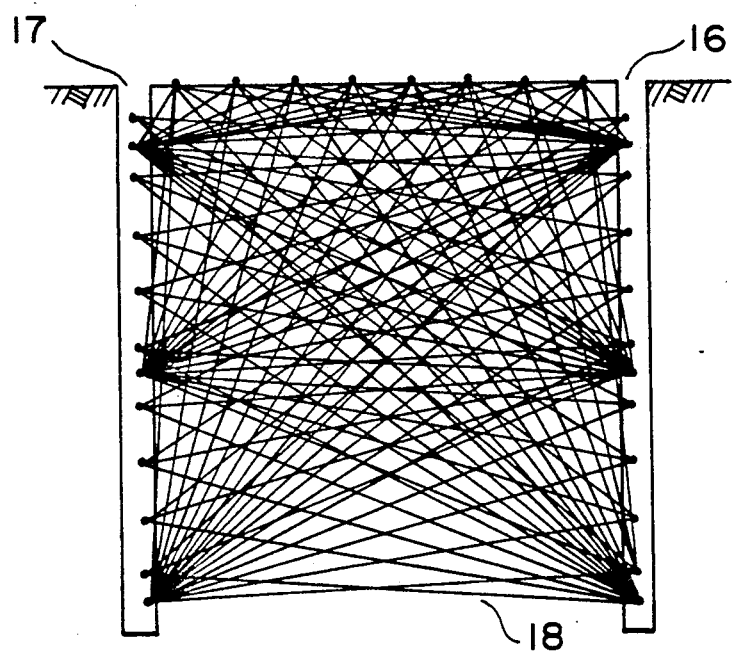
FIG. 5 is an explanatory diagram of a repetition method.

FIG. 5 is an explanatory diagram of the repetition method. As illustrated, a propagation delay time $t_k$ or amplitude $a_k$ along a wave line Rk from a transmission point to a reception point is measured, and they are expressed by the following expressions (2) and (3) respectively.

$$t_k = \int_{Rk} \frac{ds}{V(x,y)} \quad (9)$$

$$a_k = \int_{Rk} \frac{ds}{a(x,y)} \quad (10)$$

In the above expressions, V(x,y) represents the distribution of speed in a section, and a(x,y) represents the distribution of an attenuation parameter.

Figure 6:
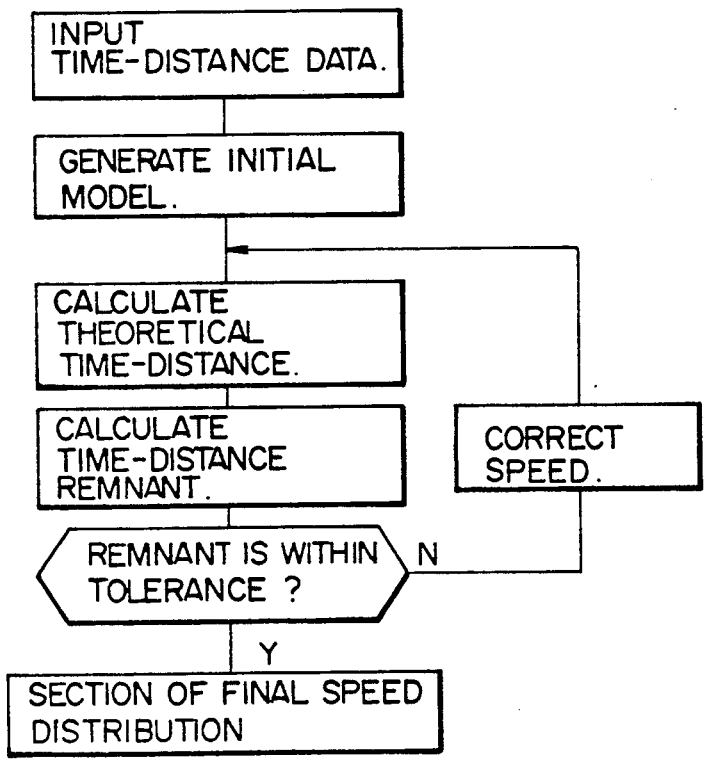
FIG. 6 is a flow chart illustrating the operation of the repetition method.

FIG. 6 is a flow chart illustrating the operation of the repetition method in the operator 14. After running time data is inputted, initial models $V_0(x,y)$ and $a_0(x,y)$ are established, $t_k$ and $a_k$ are obtained upon a pair of the same transmission and reception points as measured data in accordance with the expressions (9) and (10), and the models are corrected and approached to the real conditions so as to reduce the relevant data from measured values.

Figure 7A:
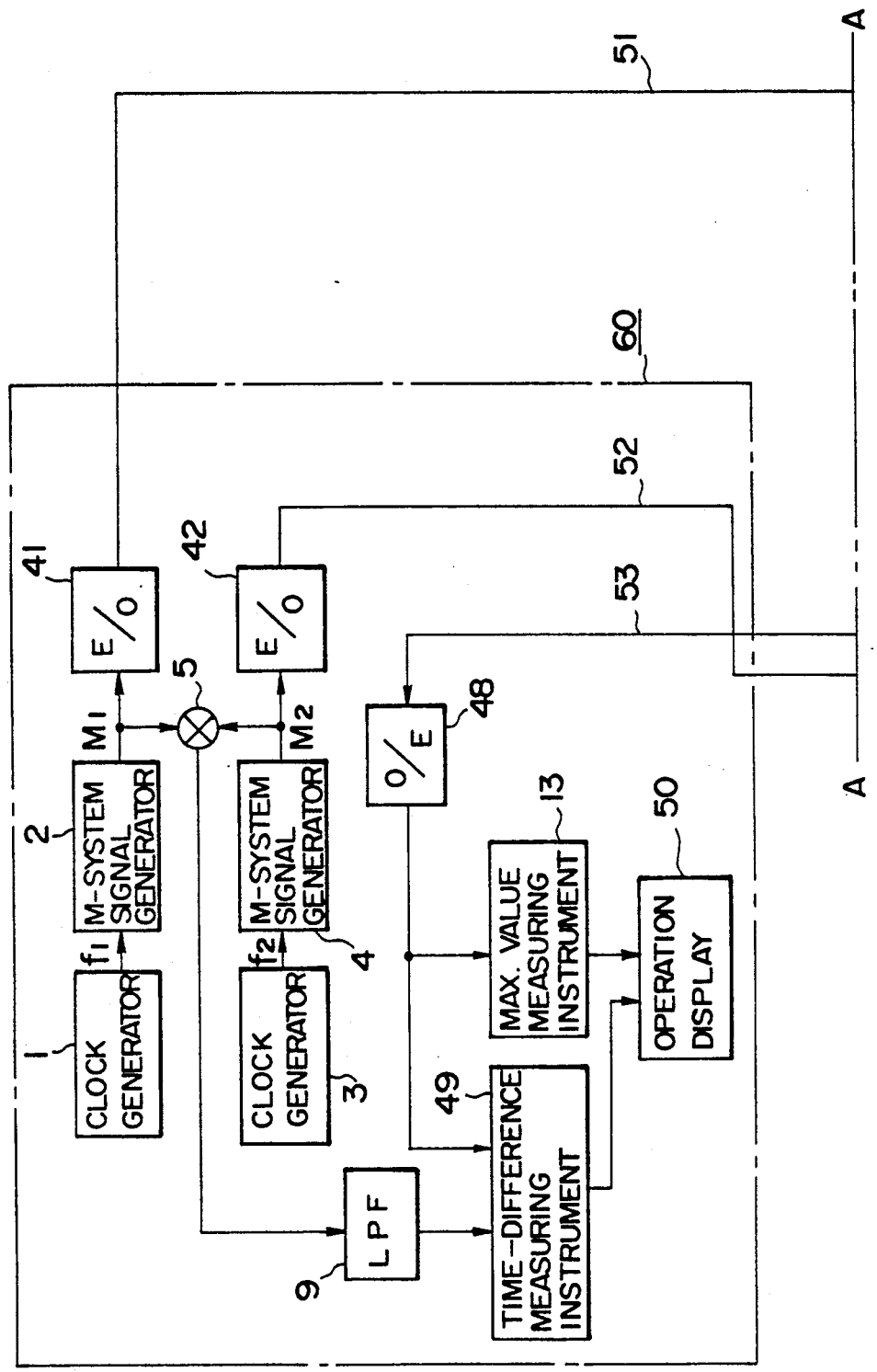
FIGS. 7A and 7B are block diagrams illustrating the configuration of the underground radar tomographic apparatus according to another embodiment of the present invention.
Figure 7B:
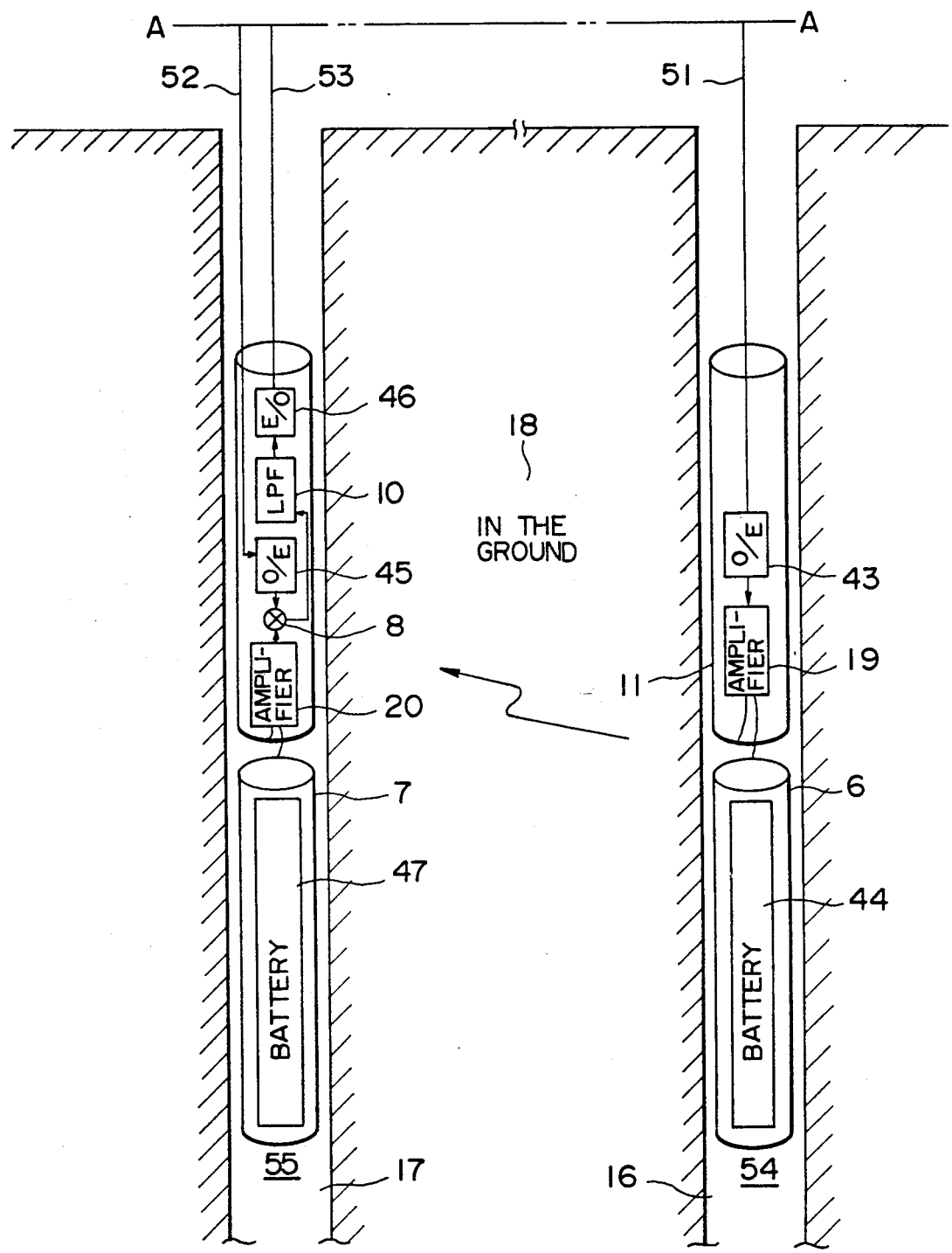

FIGS. 7A and 7B are block diagrams illustrating the configuration of the underground radar tomographic apparatus according to another embodiment of the present invention. In FIGS. 7A and 7B, the reference numerals 41 and 42 represent converters each for converting an electric signal into a light signal. The reference numeral 43 represents a converter for converting a light signal into an electric signal, and 44 represents a battery for power supply in a transmission sonde. The reference numeral 45 represents a converter for converting an electric signal into a light signal, 46 represents converter for converting a light signal into an electric signal, 47 represents a battery for power supply in a reception sonde, 48 represents a converter for converting a light signal into an electric signal, 13 represents a maximum value measuring instrument for measuring the amplitude of a maximum portion, 49 represents a time difference measuring instrument for obtaining a propagation time from the time difference between a detection signal and a reference signal, and 50 represents an operation display for displaying an operation for performing a tomographic operation from the strength or propagation time of a detection signal and the result of operation. The reference numerals 51 to 53 represent optical fiber cables respectively. The reference numeral 54 represents a transmission sonde, and 55 represents a reception sonde. The reference numeral 31 represents the underground. The reference numeral 60 represents a radar apparatus.

Next, the configuration of the apparatus of FIGS. 7A and 7B will be described.

The frequencies of clock signal generators 1 and 3 are selected taking into consideration the radio wave transmissibility in the underground and the detection resolution by using synthesizers which can vary the frequency in a range of from 1 MHz to 1 GHz with a high accuracy. Hereinafter, description will be made as to the case where the clock frequency is set to 100 MHz.

The frequencies of the clock generators 1 and 3 are set to 100.004 MHz and 99.996 MHz respectively and the clock generators 1 and 3 drive the M-sequence signal generators 2 and 4 with those frequencies respectively. The M-sequence signal generators 2 and 4 are employed as one kind of pseudo random signal generating means. Alternatively, barker code or gold code system signals, or JPL code system signals may be used instead of the M-sequence signals. In this embodiment, however, as shown in FIG. 2, an M-sequence signal generator constituted by a 7-bit shift register is used.

Figure 8:
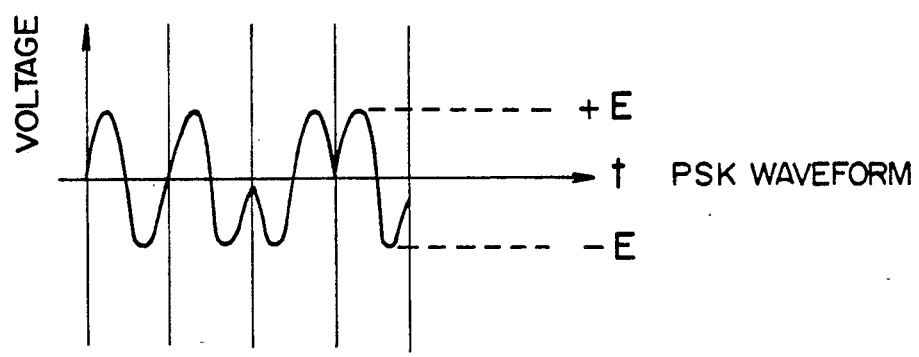
FIG. 8 is a diagram of an output waveform of an M-sequence signal generator.

FIG. 8 shows a portion of an output waveform of an M-sequence signal generator. It is an example of a PSK (phase shift keying) waveform in which the logical value "1" is made to correspond to the waveform which changes from a voltage +E to a voltage −E, and the logical value "0" is made to correspond to the waveform which changes from the voltage −E to the voltage +E. Being superior in efficiency of electromagnetic wave radiation to that of FIG. 3, the PSK waveform is used in this embodiment.

As the electric-signal-to-light-signal converters 41 and 42, the optical fiber cables 51 and 52, and the light-signal-to-electric-signal converters 43 and 46, used are high-speed digital signal transmitting optical communication devices so that a high-speed M-sequence signal generated in a radar apparatus is transmitted to the transmission sonde 54 and the reception sonde 55. As an amplifier 19, used is a broad band power amplifier of 3 W for power-amplifying an M-sequence signal to thereby excite an antenna. As the batteries 44 and 47, used are nickel-cadmium cells which are small in size and which can be used for a long time. Antennas 6 and 7 are dipole antennas constituted by cylindrical aluminum pipes and provided with balun coils at the center portions thereof for the purpose of electrical matching.

The outsides of the respective antennas are subjected to insulation and water-proof treatment with plastics. The electric-signal-to-light-signal converter 45, the optical fiber cable 52, and the light-signal-to-electric-signal converter 48, use a low-speed analog signal transmitting optical communication device. According to the present invention, such a signal processing on an M-sequence signal as will be described later is performed in the reception sonde, and consequently the signal made to have a sufficiently low speed and to have an improved SN ratio is transmitted to a radar apparatus through the optical communication device, so that the signal is less in distortion in its waveform or its SN ratio.

The reinforced member such as a tension member and the outer coating of the optical fiber cable 51 are made of a non-metal material. The optical fiber cable 51 also serves to suspend the transmission sonde 54 in a borehole. The optical fiber cables 52 and 53 are accommodated within a non-metal cable together with a non-metal tension member, and also serve to suspend the reception sonde in a borehole.

As an amplifier 20 in the reception sonde, used is a high-sensitive broad-band logarithmic amplifier to provide a proper reception sensitivity correspondingly to the strength of an input signal. In addition, a variable attenuator is incorporated in this amplifier at its input so as to make it possible to change the sensitivity desirably. Although not shown in FIGS. 7A and 7B, another optical communication device may be additionally provided between the radar apparatus and the reception sonde, so that the variable attenuator in this amplifier can be adjusted from the radar apparatus.

Next the operation of this embodiment will be described.

Although the M-sequence signal generators 2 and 4 have the same circuit arrangement, the clock signals for driving the respective signal generators are different in frequency slightly from each other, the respective periods of the two M-sequence signals are slightly different from each other, that is, 1269.9492 ns and 1270.0508 ns respectively. Therefore, assuming that these two M-sequence signals $M_1$ and $M_2$ are circulatingly generated and the patterns of the two M-sequence signals are coincident with each other at a certain point of time $t_a$, the time gap of 0.1 ns is produced between the two signals every time when the time corresponding to one period occurs. The time gap of 10 ns is produced between the two signals after 100 periods. Then, since an M-sequence signal produces 127 pieces of signal in its one period of 1270 ns, the production time of one signal is 10 ns.

Therefore, the time gap of 10 ns produced between the two M-sequence signals $M_1$ and $M_2$ corresponds to relative shifting between the two signals by a time corresponding to one piece of signal of the M-sequence signal. The timing relationship of those signals is shown in FIG. 4.

Each of the M-sequence signals $M_1$ and $M_2$ respectively produced from the M-sequence signal generators 2 and 4 is branched into two, one-side signal of which is supplied to the multiplier 5. As the multipliers 5 and 8, for example, broad band double balanced mixers (DBM) are used, so that the two M-sequence signals supplied thereto are multiplied by each other. An M-sequence signal is a positive or negative voltage signal as mentioned above, so that the product as a result of multiplication between the same signs becomes a positive voltage, and the product as a result of multiplication between the different signs becomes a negative voltage, so that a positive or negative voltage signal can be obtained as the output of the multipliers 5 and 8.

Therefore, in the vicinity of the point of time $t_a$ at which the patterns of the two M-sequence signals $M_1$ and $M_2$ are coincident with each other, the output signal of the multiplier 5 is a DC positive voltage or a positive voltage pulse train. However, the respective periods of these two M-sequence signals $M_1$ and $M_2$ are different slightly from each other, and a time gap of 0.1 ns is produced between the two signals for every one period of time. In 100 periods after the point of time $t_a$, the time gap of 10 ns, that is, the shift corresponding to one signal is produced between the two M-sequence signals $M_1$ and $M_2$. In this state, the two signals have no correlation so that positive and negative pulse-train signals are produced at random in the output of the multiplier 5.

The output signal of the multiplier 5 is supplied to the low pass filter 9 and converted into a DC voltage. The output signal of the low pass filter 9 takes a maximum value at the point of time $t_a$ when the patterns of the two M-sequence signals $M_1$ and $M_2$ become coincident with each other, and takes a minimum value at the time when the M-sequence signal $M_2$ is shifted forward or backward by 100 periods from the point of time $t_a$, that is, at the point of time $t_a \pm 127$ μs. This output signal becomes a voltage signal of a triangular wave which decreases straight from this maximum value as an apex to the forward and backward minimums, and which is outputted from the low pass filter 9 every 16.1 ms when the periodical state of the two M-sequence signals occurs as mentioned above.

The output signal of the low pass filter 9 is supplied to the time difference measuring instrument 49 so as to provide a reference time for correcting the fixed delay time in the radar apparatus from the point of time of generation of the triangle wave to thereby measure the underground propagation time of the electromagnetic wave.

The M-sequence signal $M_1$ outputted from the M-sequence signal generator 2 is supplied to the transmission antenna 6 through the above-mentioned optical communication device, and radiated as an electromagnetic wave into the underground. This thus radiated electromagnetic wave reaches the reception antenna 7 through the underground 18. At this time, the received M-sequence signal is a signal which is delayed by the propagation time of the electromagnetic wave in comparison with the transmitted M-sequence signal.

The M-sequence signal $M_2$ outputted from the M-sequence signal generator 4 is supplied to the multiplier 8 in the reception sonde through the above-mentioned optical communication device, and multiplied with the received M-sequence signal, and the result of multiplication is passed through the low pass filter 10. The above-mentioned operation is the same as the operation which has been described with respect to the multiplier 5 and the low pass filter 9. The only difference is that the point of time when the patterns of the two M-sequence signals $M_1$ and $M_2$ become coincident is different from each other.

The detection signal which is integrated and made low in speed by the low pass filter 10 is supplied to the time difference measuring instrument 49 and the maximum value measuring instrument 13 in the radar apparatus through the above-mentioned optical communication device. In the time difference measuring instrument 49, the point of time when the maximum value of the detection signal is generated is measured on the basis of the above-mentioned reference time, so that it is possible to obtain the propagation time of the electromagnetic wave. At this time, the point that the time axis is expanded in comparison with the propagation time of a real electromagnetic wave in the case of measuring the propagation time in the time difference measuring instrument, is the same as in the case of the above embodiment.

In addition, in the maximum value measuring instrument 13, the amplitude at the maximum portion of the detection signal is measured, so that it is possible to measure the attenuation of the electromagnetic wave.

Consequently, information with respect to the propagation time and attenuation of the electromagnetic wave in the underground is supplied to the operation display 50, and on the basis of this information, a sectional image of the underground is operated and displayed in the same manner as in the above-mentioned embodiment.

Figure 9A:
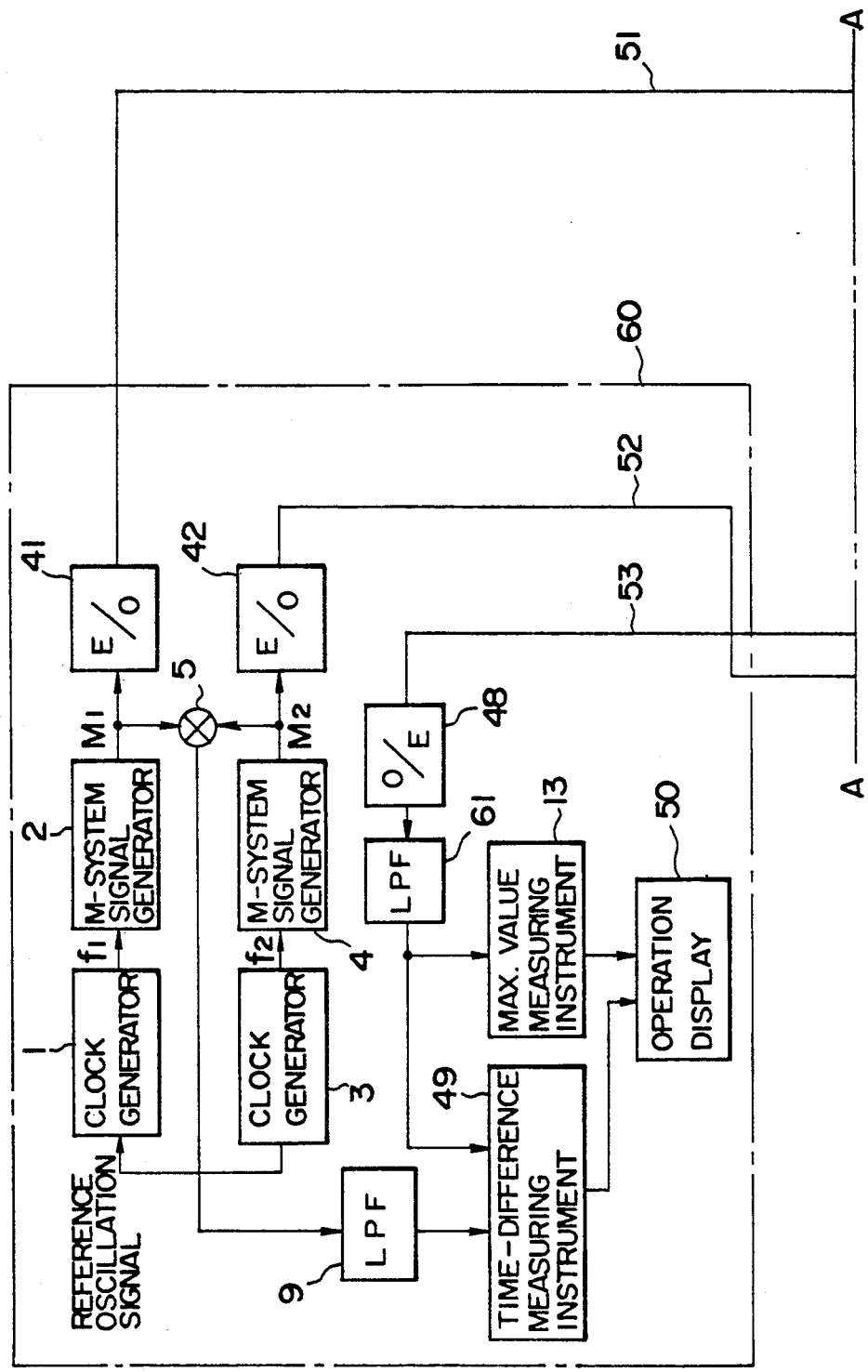
FIGS. 9A and 9B are block diagrams illustrating the configuration of the underground radar tomographic apparatus according to a further embodiment of the present invention.
Figure 9B:
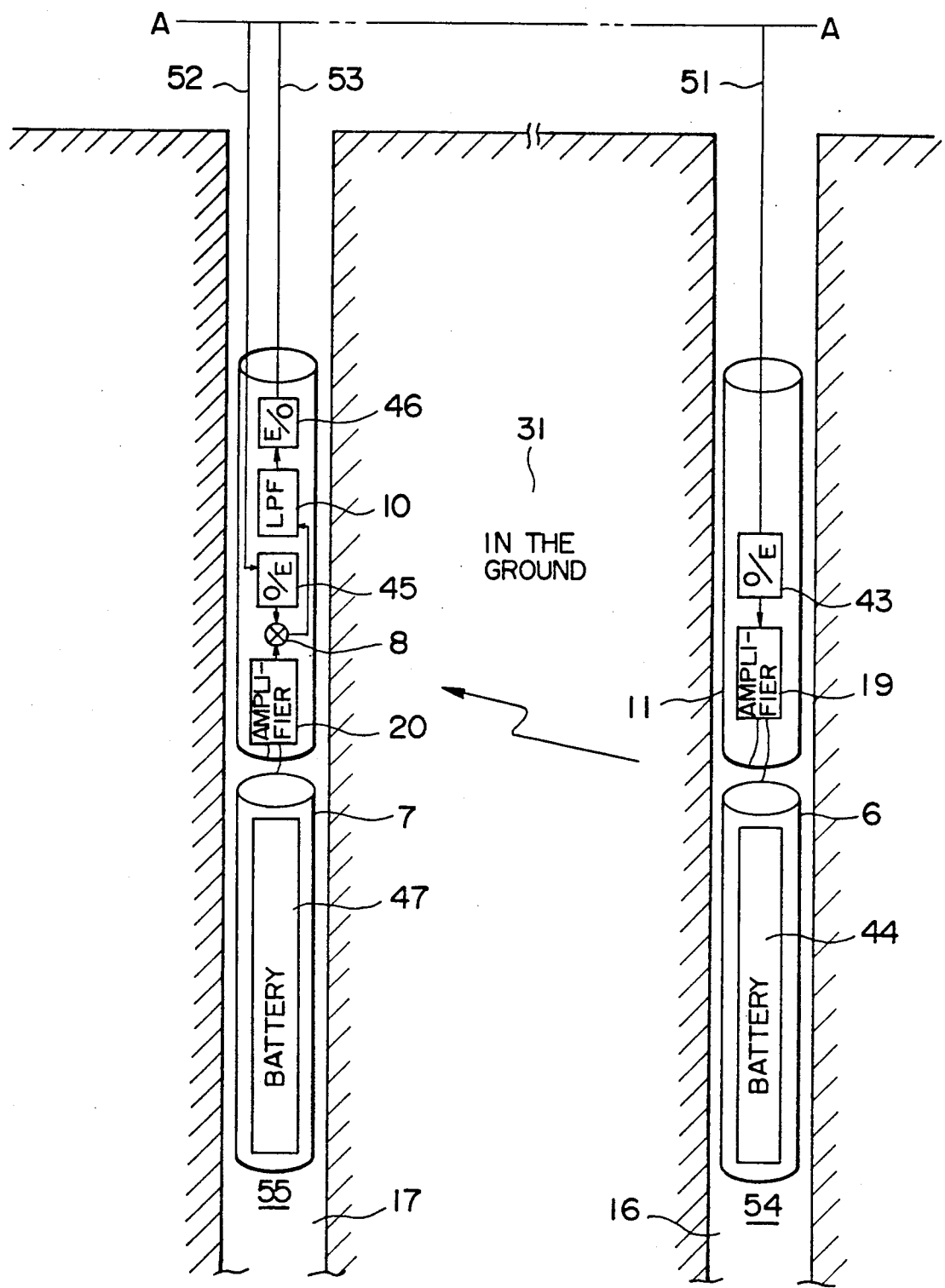

FIGS. 9A and 9B are block diagrams illustrating the configuration of the underground radar tomographic apparatus of another embodiment of the present invention. This embodiment differs from that shown in FIGS. 7A and 7B that a low pass filter 61 having a variable cut-off frequency is provided on the output side of a light-signal-to-electric-signal converter 48, and clock generators having variable oscillating frequencies are employed as clock generators 1 and 3, and the code length of M-sequence signals is made changeable.

Next the configuration of the apparatus shown in FIGS. 9A and 9B will be described.

The frequencies of the respective clock signal generators 1 and 3 are selected taking into consideration the radio wave transmissibility in the underground and the detection resolution by using synthesizers which can vary the frequency from 1 MHz to 1 GHz with a high accuracy. In this embodiment, the difference of the clock frequencies of the two clock signal generators can be set to 1 Hz, 100 Hz and 8 KHz. In order to maintain the frequency difference stably, employed is a method in which a reference oscillator in one of the synthesizers is used in common.

Hereinafter, the case where the clock frequency is set to about 100 MHz will be described.

For example, the frequencies of the clock generators 1 and 3 are set to 100.004 MHz and 99.996 MHz respectively and the clock generators 1 and 3 drive the M-sequence signal generators 2 and 4 with those frequencies respectively. The M-sequence signal generators 2 and 4 are employed as one kind of pseudo random signal generating means. Alternatively, barker code or gold code system signals, or JPL code system signals may be used in stead of the M-sequence signals.

Figure 10:
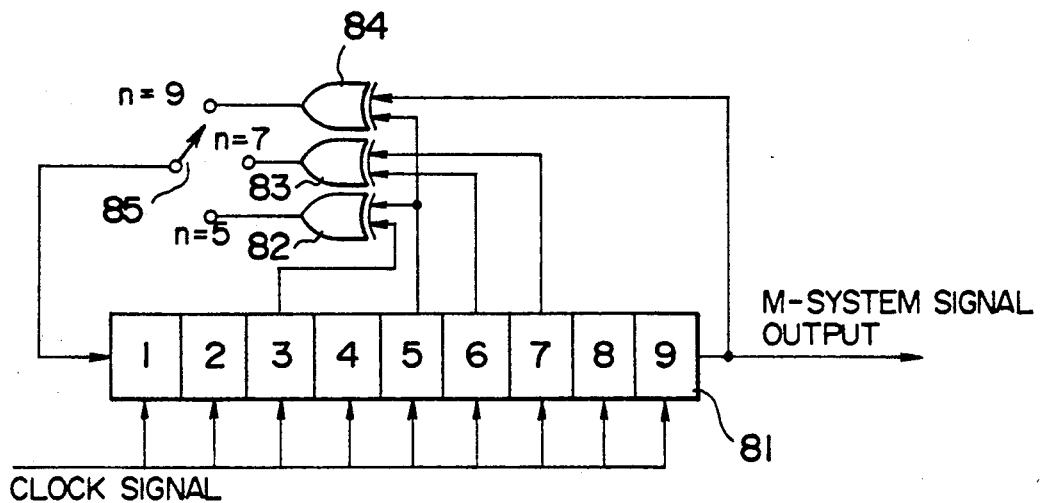
FIG. 10 is a circuit diagram of an M-sequence signal generator of FIG. 9A.

In this embodiment, as shown in FIG. 10, a 9-bit shift register 81 is used and a feedback circuit constituted by exclusive OR circuits 82 to 84 is switched by a switch 85, so that it is made possible to change the code length (period) of M-sequence signals. That is, by switching the stage number n of the shift register 81 to 9, 7 and 5, it is possible to switch the code length of M-sequence signals to $2^9 - 1 = 511$, $2^7 - 1 = 127$, and $2^5 - 1 = 31$ respectively. Consequently, in the above-mentioned clock frequency, assuming that the propagation speed in the soil is $v = 0.6 \times 10^8$ m/s, it is possible to change the measurement range in the soil to L = 307 m, 76 m, and 19 m from the expression (8).

In the above-mentioned manner, produced is an M-sequence signal which is a periodical circulating code of a binary signal but is random within the above-mentioned variable code length.

Figure 11:
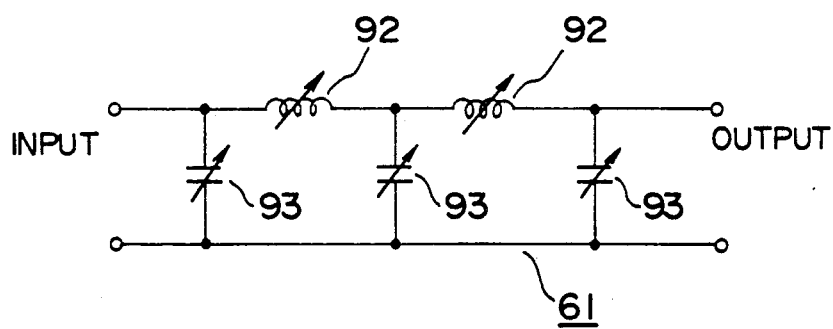
FIG. 11 is a circuit diagram of a low pass filter having a variable cut-off frequency.

A detection signal transmitted to the radar apparatus is passed through the low pass filter 61 and subjected to necessary and sufficient band control, so that it is possible to suppress noises to thereby obtain a large SN ratio. In this embodiment, the low pass filter 61 is constituted by a variable inductor 92 and a variable capacitor 93 as shown in FIG. 11, and has a variable cut-off frequency, which is made about 5 times as high as the frequency difference between the above-mentioned two clock frequencies.

Next the operation of this embodiment will be described.

The processes after the M-sequence signals $M_1$ and $M_2$ respectively outputted from the M-sequence signal generators 2 and 4 are transmitted through optical fibers 51 and 52, etc., till the received waveforms are converted by a light-signal-to-electric-signal converter 48 are the same as those in the embodiment of FIGS. 7A and 7B, and therefore the detailed description thereof is omitted herein.

In the radar apparatus 60, a transmitted detection signal is passed through the low pass filter 61. Since the cut-off frequency of the low pass filter 61 can be varied so as to be set to a value 5 times as high as the frequency difference $\Delta f$ between the clock frequencies $M_1$ and $M_2$, it is possible to obtain the optimum noise suppression effect.

For example, let the average value of the two clock frequencies be $f_c$, and the noise suppression effect Sup is determined by the ratio between the frequency band of a transmitted/received signal and the frequency band of a detection signal after passed through a low pass filter and generally expressed by the following expression.

$$\text{Sup(noise suppression effect)} = 10 \log(\Delta f / f_c)$$

Therefore, for example, in the case of $f_c = 100$ MHz, the noise suppression effect Sup can be obtained as follows.

If Δf=1 Hz, Sup= −80 dB

If Δf=100 Hz, Sup= −60 dB

The detection signal obtained thus through the low pass filter 61 is supplied to a time difference measuring instrument 49 and an maximum value measuring instrument 13. In the same manner as in the embodiment of FIGS. 7A and 7B, information as to the propagation time and attenuation of the electromagnetic wave in the underground is supplied to an operation display 50, and on the basis of this information so that a sectional image of the underground is operated and displayed in the display 50.

We claim:

1. A method of underground radar tomography comprising the steps of:

generating first and second pseudo random signals which are same in code pattern but slightly different in period from each other;

multiplying said first and second pseudo random signals by each other to thereby generate a first time series pattern signal;

transmitting said first pseudo random signal into the ground to be measured;

receiving said first pseudo random signal through the ground to be measured, and multiplying the received signal by said second pseudo random signal to thereby generate a second time series pattern signal;

measuring the time difference between said first and second time series pattern signals and the signal strength of said second time series pattern signal; and processing the data of the measured time difference and signal strength to thereby obtain sectional information corresponding to the distribution of strata and soil in the ground.

2. An underground radar tomography according to claim 1, in which a selected one of an M-sequence signal, a gold code system and a JPL code system signal is used as each of said first and second pseudo random signals.

3. An underground radar topographic apparatus comprising:

a first clock generator for generating a first clock signal;

a first pseudo random signal generator driven by said first clock signal for generating a first pseudo random signal;

a second clock generator for generating a second clock signal having a frequency which is slightly different from a frequency of said first clock signal;

a second pseudo random signal generator driven by said second clock signal for generating a second pseudo random signal;

a first multiplier for multiplying said first and second pseudo random signal by each other;

a transmitter means movably installed in the ground for transmitting said first pseudo random signal to the ground to be measured;

a receiver means movably installed in the ground facing to said transmitter means through the ground to be measured for receiving said first pseudo random signal transmitted from said transmitter means through the ground to be measured;

a second multiplier for multiplying said first pseudo random signal by the signal received by said receiver means;

a time difference measuring instrument for measuring a time difference between an output signal of said first multiplier and an output of said second multiplier;

a signal strength measuring instrument for measuring signal strength of the output signal of said second multiplier; and an apparatus for processing information with respect to said time difference and signal strength obtained by said time difference measuring instrument and said signal strength measuring instrument respectively to thereby obtain section information of the strata and soil in the ground.

4. An underground radar tomographic apparatus according to claim 3, further comprising:

a first low pass filter for receiving the output signal of said first multiplier and for performing band limitation on the received signal;

a second low pass filter for receiving the output signal of said second multiplier and for performing band limitation of the received signal;

a first maximum value measuring instrument for measuring a maximum value of an output of said first low pass filter;

a second maximum value measuring instrument for measuring a maximum value of an output of said second low pass filter; and a time measuring instrument for measuring a time from a point of time at which a maximum value is detected by said first maximum value measuring instrument and a point of time at which a maximum value is detected by said second maximum value measuring instrument.

5. An underground radar tomographic apparatus according to claim 3, in which a selected one of an M-sequence signal, a gold code system signal and a JPL code system signal is used as each of said first and second pseudo random signals.

6. An underground radar tomographic apparatus according to claim 3, further comprising:

a first low pass filter for receiving the output signal of said first multiplier and for performing band limitation on the received signal to thereby supply an output to said time measuring instrument;

a first electro-optical converter for converting said first pseudo random signal into a light signal;

a first optical fiber for transmitting said light signal converted by said first electro-optical converter;

a transmission sonde for converting said light signal transmitted through said first optical fiber into an electromagnetic wave and for radiating said electromagnetic wave into the ground;

a second electro-optical converter for converting said second pseudo random signal into a light signal;

a second optical fiber for transmitting said light signal converted by said second electro-optical converter;

a reception sonde including a second multiplier for receiving the electromagnetic wave from the underground and for multiplying the reception signal by the signal of said second optical fiber, and a filter for performing band limitation on the result of multiplication of said second multiplier, an output of said filter being outputted as a light signal;

a third optical fiber for transmitting said light signal outputted from said reception sonde;

a third opto-electrical converter for converting said light signal transmitted through said third optical fiber into an electric signal and for supplying the output signal of said second multiplier to said time difference measuring instrument and said amplitude measuring instrument.

7. An underground radar tomographic apparatus according to claim 3, in which the output clock frequency of each of said first and second clock generators is set to a value within a range of from 1 MHz to 1 GHz.

8. An underground radar tomographic apparatus according to claim 3, in which said apparatus further comprises:
 a first low pass filter for performing band limitation on the output of said first multiplier and for supplying an output of said first low pass filter to said time measuring instrument;
 a second low pass filter for performing band limitation on the output of said second multiplier and for supplying an output of said second low pass filter to said time difference measuring instrument and said signal strength measuring instrument; and in which at least one of said first and second clock generators is arranged so that the clock frequency thereof is variable, and of said first and second low pass filters, at least said second low pass filter is arranged so as to have a cut-off frequency which is variable so as to be from one to 20 times as high as a difference frequency between the respective clock frequencies of said first and second clock generators.

9. An underground radar tomographic apparatus according to claim 3, in which a pseudo random signal generator which generates a pseudo random signal the code length of which is made variable is used as each of said first and second pseudo random signal generators.

10. An underground radar tomographic apparatus according to claim 8, in which at least one of a signal transmission path between a radar body and a transmission sonde and another transmission path between said radar body and a reception sonde is constituted by an optical transmission path.

* * * * *